(12) United States Patent
Sweet et al.

(10) Patent No.: US 7,263,627 B2
(45) Date of Patent: Aug. 28, 2007

(54) SYSTEM AND METHOD HAVING STRAPPING WITH OVERRIDE FUNCTIONS

(75) Inventors: James D Sweet, Sunnyvale, CA (US); Thu T Nguyen, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 454 days.

(21) Appl. No.: 10/641,103

(22) Filed: Aug. 15, 2003

(65) Prior Publication Data
US 2005/0038987 A1 Feb. 17, 2005

(51) Int. Cl.
- *G06F 1/12* (2006.01)
- *G06F 13/42* (2006.01)
- *H04L 5/00* (2006.01)
- *H04L 7/00* (2006.01)

(52) U.S. Cl. ............ 713/400; 713/300; 713/401; 700/2; 700/3; 700/28; 700/40; 712/32; 712/38; 712/39; 709/209

(58) Field of Classification Search ............ 700/2, 700/3, 28, 40; 712/32, 38, 39; 713/300, 713/310; 709/209
See application file for complete search history.

(56) References Cited

U.S. PATENT DOCUMENTS

| | | | | |
|---|---|---|---|---|
| 4,656,651 A | * | 4/1987 | Evans et al. ............ 379/15.03 |
| 5,134,691 A | * | 7/1992 | Elms .................... 709/209 |
| 5,271,023 A | * | 12/1993 | Norman .................. 714/10 |
| 5,283,903 A | * | 2/1994 | Uehara .................. 710/200 |
| 5,491,787 A | * | 2/1996 | Hashemi ................. 714/11 |
| 5,524,244 A | * | 6/1996 | Robinson et al. ......... 717/140 |
| 5,572,663 A | * | 11/1996 | Hosaka .................. 714/12 |
| 5,781,774 A | * | 7/1998 | Krick ................... 713/1 |
| 5,790,873 A | * | 8/1998 | Popper et al. ........... 713/300 |
| 5,878,264 A | * | 3/1999 | Ebrahim ................. 713/323 |
| 5,909,369 A | * | 6/1999 | Gopinath et al. ......... 700/3 |
| 5,968,140 A | * | 10/1999 | Hall .................... 710/14 |
| 6,101,319 A | * | 8/2000 | Hall .................... 714/42 |
| 6,584,560 B1 | * | 6/2003 | Kroun et al. ............ 713/2 |
| 6,584,571 B1 | * | 6/2003 | Fung .................... 713/310 |
| 6,789,183 B1 | * | 9/2004 | Smith et al. ............ 712/32 |

* cited by examiner

*Primary Examiner*—Rehana Perveen
*Assistant Examiner*—James F. Sugent
(74) *Attorney, Agent, or Firm*—Sterne, Kessler, Goldstein & Fox PLLC

(57) ABSTRACT

A system and method allow for overriding of a strapping option. A strapping signal places a device (e.g., a processor) in first state or mode (e.g., client or master). An override system places the device in a second state or mode. The second state or mode can be temporary. The changing of the state or mode of the device can be used to perform testing of the chip, during which a memory is written to and read from to verify operation of the chip. The second state or mode of the device may also be used to allow the device to perform alternative functions that are not available during its first state or mode.

22 Claims, 3 Drawing Sheets

SYSTEM AND METHOD HAVING STRAPPING WITH OVERRIDE FUNCTIONS

BACKGROUND OF THE INVENTION

1. Field of the Invention

The present invention is related to chip that has power-up strapping functionality and that can temporarily change a state or mode of the chip.

2. Background Art

Products are manufactured that include chips having a plurality of selectable functions. The selectable functions use devices that can perform different functions allows the chips to be used in a variety of different systems. In order to properly set the function of the device, a mode or state is usually selected for the device based on the product it is incorporated within. The mode or state can be selected using a strapping system (e.g., mode or state setting system) in a variety of ways, including using: a dedicated pin, a register control block controlled by software running in the product, or the like. Thus, because a designer knows what product is being made, when the chip is inserted into the product a function of the device can be set using a signal that designates a mode or state. Using a strapping system may be favored because it does not require using a dedicated pin. Pins are in limited supply on a chip, and avoiding having to use one to set a mode of the device is desired.

In an example strapping system, an input/output (I/O) device on the chip is controlled through an enable signal. When the output is not enabled, the input floats. When the input floats, the input can be coupled to a resistive element to provide a strapping signal. The resistive element can be pulled-up (i.e., producing a HIGH strapping signal) or pulled-down (i.e., producing a LOW strapping signal). The strapping signal can be stored in a latch device or a flip-flop. During a reset operation, the latch can store the strapping signal. After the reset operation, the latch can close and the strapping signal can be substantially permanently stored. Then, a control device can use the strapping signal to set a substantially permanent mode or state of a device on the chip.

However, systems are increasingly requiring more flexibility during operation. For example, a system may need to temporarily switch modes of the device during a specified time period of operation to change the function of the device for that time period. Conventional systems using the various mode or state setting techniques cannot change the mode or state during operation (i.e., they cannot override the strapping value once it's been stored).

Therefore, what is needed is system than can change a mode or state of a device during operation.

BRIEF SUMMARY OF THE INVENTION

Embodiments of the present invention provide systems and methods for strapping with override capability. A strapping system transmits a signal to the control system that is used to place the device in a first state (or mode) (e.g., client or master). An override system transmits a signal to the control system that is used to place the device in a second state (or mode) (e.g., client or master). The second state can be a temporary state.

Further embodiments, features, and advantages of the present inventions, as well as the structure and operation of the various embodiments of the present invention, are described in detail below with reference to the accompanying drawings.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

Figure 1:
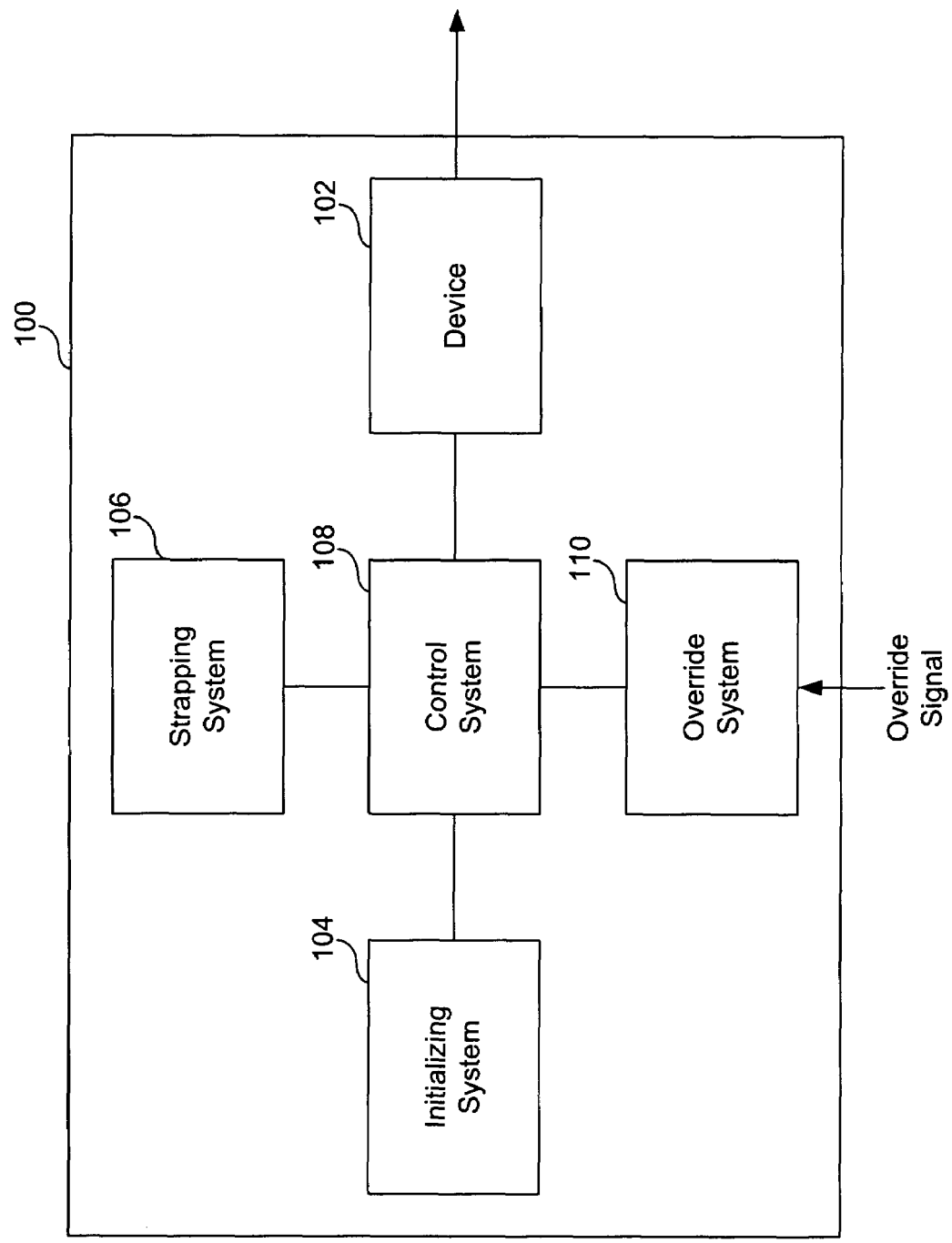
FIG. 1 shows a system according to embodiments of the present invention.

The present invention will now be described with reference to the accompanying drawings. In the drawings, like reference numbers may indicate identical or functionally similar elements. Additionally, the left-most digit(s) of a reference number may identify the drawing in which the reference number first appears.

DETAILED DESCRIPTION OF THE INVENTION

Overview

While specific configurations and arrangements are discussed, it should be understood that this is done for illustrative purposes only. A person skilled in the pertinent art will recognize that other configurations and arrangements can be used without departing from the spirit and scope of the present invention. It will be apparent to a person skilled in the pertinent art that this invention can also be employed in a variety of other applications.

Embodiments of the present invention provide a system and method that allow for overriding of a strapping signal. A strapping signal places a device (e.g., a processor) in first state or mode (e.g., client or master). An override system can be used to place the device in a second state or mode. The second state or mode can be temporary. The changing of the state or mode of the device may be needed to perform testing of the chip, during which a memory is written to and read from to verify operation of the chip. The changing of the state or mode of the device may also allow the device to perform alternative functions that are not available during its first state or mode.

For example, a product may have chip including a processor. The processor may be a client processor during a first state mode. If designated a client, the processor needs to stay a client so that it does not erroneously start performing master functions. However, the product may need the processor to perform master functions during a specified time period. This can be accomplished by overriding the strapping system with a signal, for example, from software. The software signal can override the strapping signal for a temporary period of time, allowing the processor to become a master. Once the processor has performed the master functions, the override signal ends and the processor returns to being a client.

One example product this system can be used in is Television-On-A-Chip technology.

Overall System

FIG. 1 is a block diagram of a system 100 according to embodiments of the present invention. System 100 can be a chip in a product. System 100 can include a device 102 that can be used to perform a variety of functions. After system 100 is initialized using an initialization system 104, a particular function to be performed by device 102 is designated by setting a mode or state using a strapping signal from a strapping system 106. The initialization and mode setting can be controlled by a control system 108 that receives signals from initialization system 104 and strapping system 102. This may be a semi-permanent mode, which can be changed using override system 110, as is discussed in more detail below.

Figure 2:
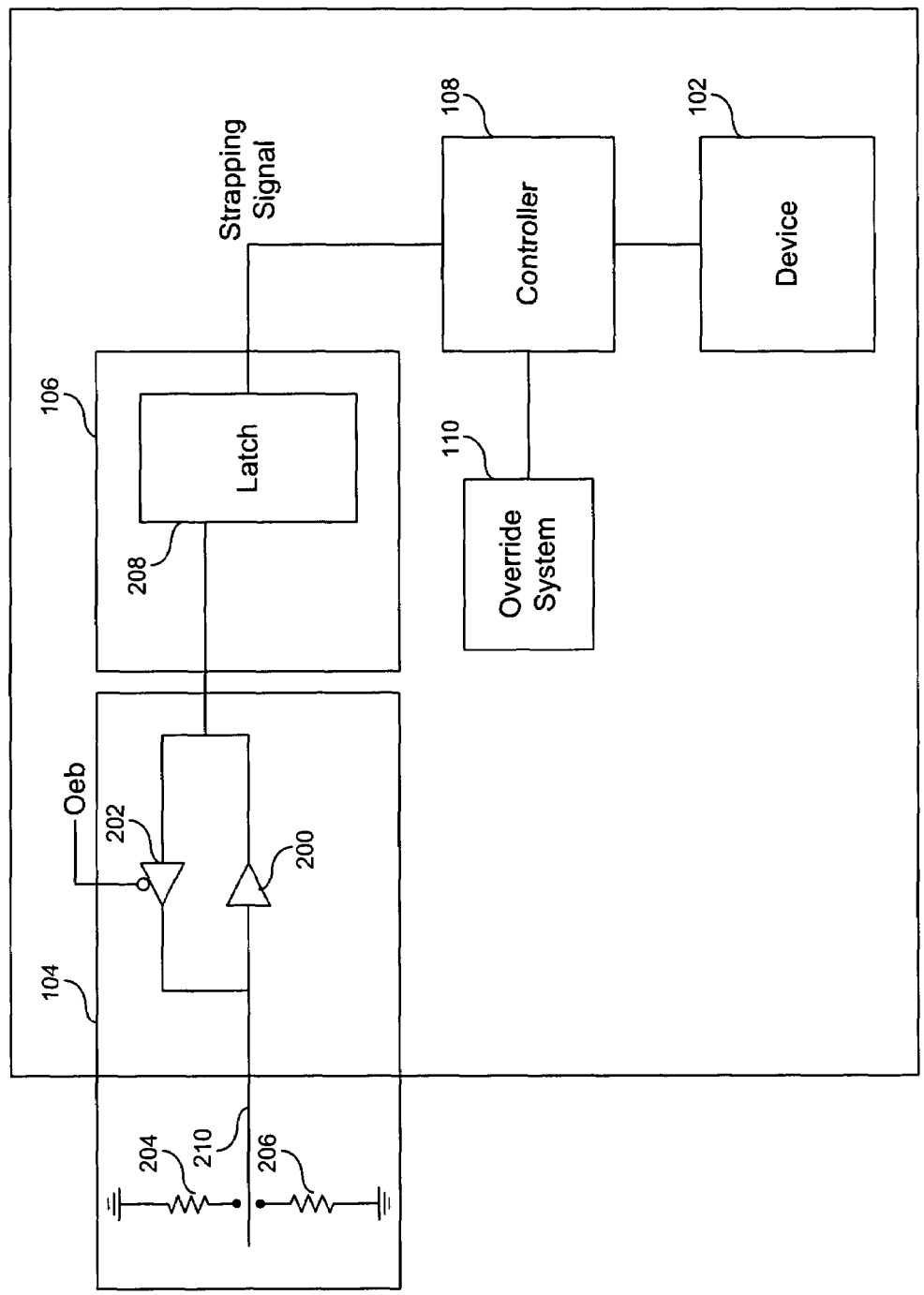
FIG. 2 shows details of the system in FIG. 1 according to an embodiment of the present invention.

FIG. 2 is a more detailed block diagram showing of system 100 according to an embodiment of the present invention. In the example in FIG. 2, strapping system 106 includes an input device 200 and an output device 202. When an enable signal Oeb is not asserted to turn on output device 202, output device 202 is inactive. When output device 202 is inactive, input device 200 transmits a signal 210 from resistors 204 or 206 to a storage device 208 (e.g., a latch). For example, if a latch is used for storage device 208, when a reset is asserted latch 208 is transparent and the value from 200 flows through 208 to 108. When the reset goes away, latch 208 closes, storing the value inside latch 208. Usually, strap values are captured during reset, so an active-low reset signal is used as the latch enable input of latch 208.

If signal 210 is from resistor 204 (e.g., a pull-up signal) the signal is a HIGH value. The HIGH value is then stored in latch 208.

If signal 210 is from resistor 206 (e.g., a pull-down signal) the signal is a LOW value. The LOW value is then stored in latch 208.

Signal 210 stored in latch 208 becomes the strapping signal that is used by controller 108 to place device 102 into a first or second state or mode (e.g., client or master). Although two resistors 204 and 206 are shown, only one resistor can be present depending on whether a pull-up or pull-down signal is desired.

Figure 3:
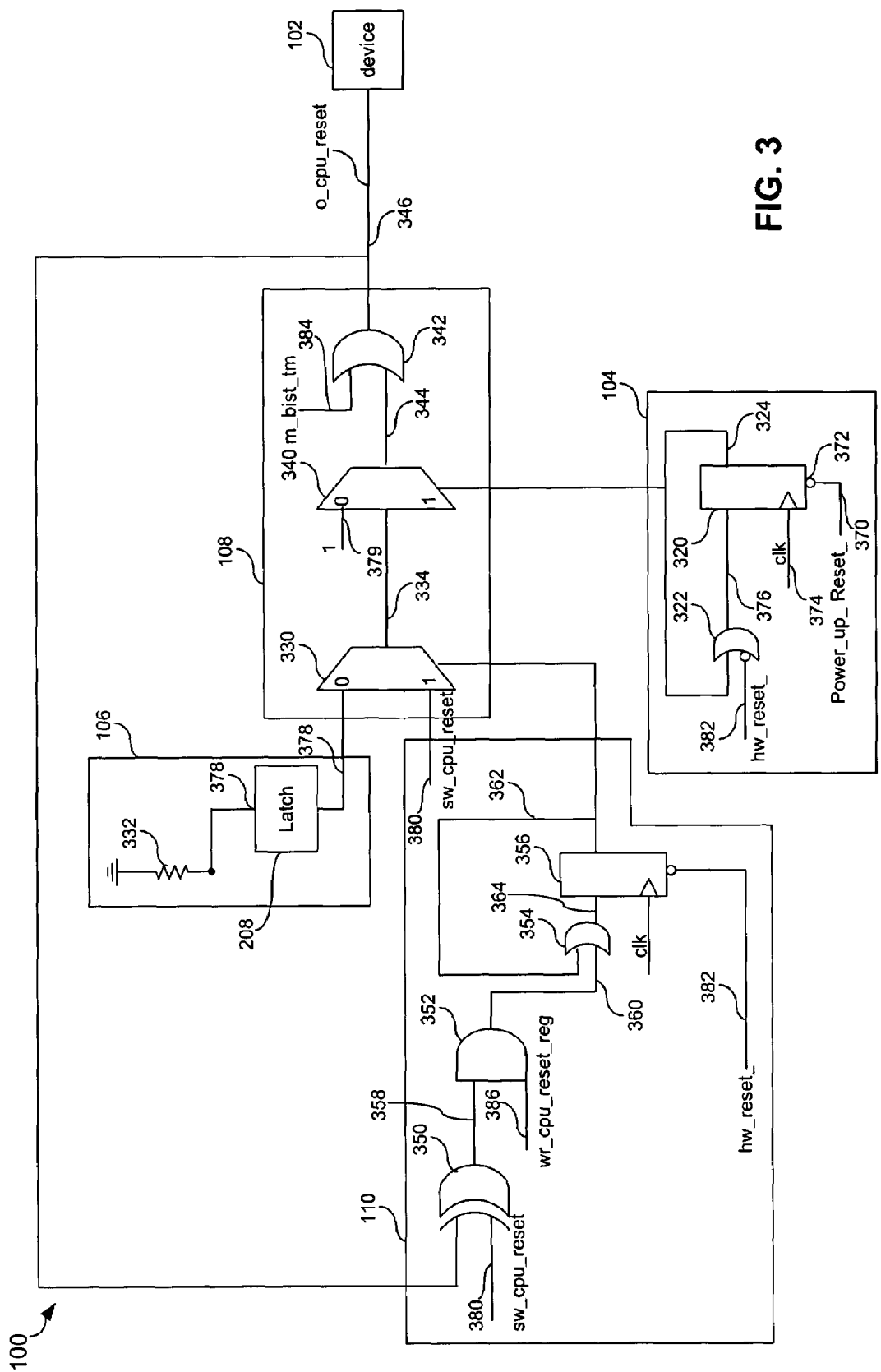
FIG. 3 shows details of the system in FIG. 1 according to another embodiment of the present invention.

FIG. 3 is a more detailed block diagram of system 100 according to an embodiment of the present invention.

In one example of FIG. 3, initialization system 104 includes a flip-flop 320 and an OR gate 322. Flip-flop 320 receives a POWER_UP_RESET_signal 370 at a control terminal 372, a clock signal 374, and a signal 376 from OR gate 322. Flip-flop 320 outputs a signal 324 to control system 108 and an input of OR gate 322. The other input of OR gate 322 receives a HW_RESET_signal (a hardware reset signal). Signal 324 is used to control multiplexer 340 at start-up to select data from input 0, so that a signal 344 is initially HIGH (e.g., a "1").

Strapping system 106 a resistive device 332, which is a pull-up resistive device in this embodiment. However, it is to be appreciated that a pull-down resistive device could also be used based on the application of the chip, as would be known to a skilled artisan.

Control system 108 includes multiplexers 330 and 340 and an OR gate 342. Multiplexer 330 receives strapping signal 378 and a SW_CPU_RESET signal 380 at its inputs and a signal 362 (see discussion of override system 110 below) at its control terminal. SW_CPU_RESET 380 is generated from a register (not shown) outside of system 100 that can be written by software. For example, SW_CPU_RESET signal 380 can be one or more bits in 32-bit or similar register in the product. So, basically, once the override has been activated, the O_CPU_RESET signal 346 comes from the register external to system 100 and is controlled by software. Multiplexer 330 selectively outputs strapping signal 378 or SW_CPU_RESET signal 380 as signal 334 under control of strapping override signal 362. In other words, multiplexer 330 initially outputs strapping signal 378 as signal 334. However, after initialization override system 110 controls multiplexer 330 so that it overrides strapping signal 378 and outputs SW_CPU_RESET 380 as signal 334 to multiplexer 340.

Multiplexer 340 receives signal 324 at its control terminal and a HIGH signal 379 (e.g., a "1") and signal 334 at its input terminals. Multiplexer 340 outputs a signal 344 to OR gate 342. More particularly, the initialization signal 324 selectively control multiplexer 340 to output either HIGH signal 379 or signal 334 as signal 344. OR gate 342 receives signal 344 and an M_BIST_TM signal 384 (e.g., a test control signal). The M_BIST_TM signal 384 is for test processes, as described below. OR gate 342 outputs a signal 346 (e.g., O_CPU_RESET) to device 102 and override system 110.

It is to be appreciated that in the embodiment shown and discussed, OR gate 342 is being used to place the output signal 346 in a certain state in a certain test mode. For example, creating O_CPU_RESET 346. In alternative embodiments, when no test mode is desired, strap value 378 could be used as signal 346 and OR gate 342 would be removed from the system 100.

Override system 110 includes an exclusive OR gate 350, an AND gate 352, and OR gate 354, and a flip-flop 356. Exclusive OR gate 350 receives input signals 348 and SW_CPU_RESET signal 380 (also received by multiplexer 330), and outputs a signal 358. AND gate 352 receives input signals 358 and WR_CPU_RESET_REG 386 and outputs signal 360. WR_CPU_RESET_REG 386 indicates that a SW_CPU_RESET register is being written, which can be a decode of a write signal and an address. WR_CPU_RESET_REG 386 is asserted during a write to the cpu reset register. OR gate 354 receives input signals 360 and 362 (from flip-flop 356, discussed below), and outputs signal 364. Flip-flop 356 receives the HW_RESET_signal 382 (also received by OR gate 322) at its reset terminal, a clock signal CLK, and signal 364. As discussed above, flip-flop 356 outputs signal 362 to OR gate 354 and control system 108.

Operation of the System

In the embodiment shown above, a reset signal 346 for the CPU is being controlled. Initially, when the system or the chip power up, to ensure stable operation of device 102, the reset signal 346 is momentarily brought HIGH until reset assertion. With the assertion of reset the product straps in one way, the O_CPU_RESET 346 will be asserted by default. If the product straps the other way, the O_CPU_RESET 346 will be de-asserted by default. The polarity of O_CPU_RESET 346 determined by the strapping will remain until a register write to SW_CPU_RESET with a value different than the current status of O_CPU_RESET 346 to change the state of the signal. Once the O_CPU_RESET 346 is changed by the register write, subsequent writes will modify the status of O_CPU_RESET 346 based on the value of SW_CPU_RESET.

It is to be appreciated that in alternative embodiments where a product only requires a strapping bit 378 that can be overriden by a register, system 104 and multiplexer 340 and OR gate 342 of system 108 can be removed from the product. Signal 346 can initially take on the value of strapping signal 378.

The behavior of the embodiment shown above can be described in seven time periods (assuming the system is not in MBIST mode and thus m_bist_tm signal 384 is low). A first time period is during power-up reset. In this time period, POWER_UP_RESET_370 is low, 324 is low and 346 takes on a value of signal 379, which is a HIGH.

A second time period is after power-up reset and before regular hardware reset. In this time period, POWER_UP_RESET_370 is HIGH, 324 is LOW, and O_CPU_RESET 346 remains HIGH.

A third time period is during hardware reset. In this time period, HW_RESET_382 is LOW, 376 is HIGH, 324 is HIGH (after a rising edge of CLK 374). Since 324 is HIGH, multiplexer 340 switches over to select input terminal 1, which is signal 379. Signal 382 (in override system 110) is also LOW, so 362 is LOW, and 379 comes from 378 (which is the strap value, e.g. HIGH), 379 is HIGH, 344 is HIGH, and 346 is HIGH.

A fourth time period is after hardware reset is de-asserted. WR_CPU_RESET_REG386 is LOW (because the register is not currently being written to), so 360 is LOW. 362 was LOW and stays LOW (because 364 is LOW). Signal 379 still comes from 378 and 346 remains at the strap value 378 (e.g., HIGH).

A fifth time period lasts for one clock and it's the time when the SW_CPU_RESET register is being written. WR_CPU_RESET_REG 386 is HIGH, allowing 358 to become significant. Assuming that the SW_CPU_RESET register is being written to change the state (i.e., 380 is the opposite state of 346, e.g., LOW) then 358 is HIGH, 360 is HIGH, 364 is HIGH.

A sixth time period starts one clock after the fifth time period. The HIGH value on 364 gets clocked into 356 and appears on 362. Since 362 feeds back around into 354, 364 and 362 will be HIGH from now on. Since 362 and 324 are HIGH, O_CPU_RESET 346 now comes from the sw_cpu_reset register (e.g., 346 is LOW). Depending on clock domains and clock synchronization between the clock for SW_CPU_RESET register and the clock for flip-flop 356, the fifth and sixth time period can be combined into one time period.

A seventh time period occurs after the sw_cpu_reset register has been written to again. Assuming that sw_cpu_reset register is being written to change the state of O_CPU_RESET from LOW back to HIGH, then 380 is HIGH, 362 is HIGH (because it will always be HIGH after the first write), 379 is HIGH, 324 is HIGH, 344 is HIGH, and O_CPU_RESET 346 reflects the current value of the SW_CPU_RESET register, which is a HIGH. Subsequent writes to the sw_cpu_reset register will continue to change the value of O_CPU_RESET 346, while 362 and 324 remain unchanged HIGH.

Therefore, after initialization, system 100 can change into the second state or mode with just a single write. System 100 can also change back to the original state or mode with just a single write. In the embodiment shown above, after an initial write to SW_CPU_RESET 380 that changes the state of signal 346, the status of O_CPU_RESET 346 is determined by the value of SW_CPU_RESET. WR_CPU_RESET_REG 386 is the write pulse that occurs (i.e., goes HIGH) every time SW_CPU_RESET 380 gets programmed. Following the first mode or state, three operations can occur During a first operation, SW_CPU_RESET 380 is HIGH. Since signal 346 is already HIGH, writing a HIGH to SW_CPU_RESET 380 will not change the state of signal 362 and signal 346 will remain HIGH.

During a second operation, SW_CPU_RESET 380 is LOW. Since signal 346 is already HIGH, writing a LOW to SW_CPU_RESET 380 will change the state of signal 362 to a HIGH and multiplexer 330 will select data from input terminal 1. The input data from input terminal 1 is SW_CPU_RESET 380, which is LOW, thus resulting in signals 334, 344, and 346 being LOW.

During a third operation, signal 346 can be changed back to its initial state or mode by simply writing to SW_CPU_RESET 380 with a HIGH. Since the output signal 346 from module 108 is gated with the SW_CPU_RESET 380 signal by an exclusive-OR 350, only programming SW_CPU_RESET 380 with different polarity as that of signal 346 will change that state of signal 346. Programming SW_CPU_RESET 380 with the same polarity as that of signal 346 will not change the state of signal 346.

Thus, override system 110 can be used to override a current state or mode of device 102 based on receiving specific SW_CPU_RESET and W_CPU_RESET signals from the software running in the product. Having the ability to override strapping signal 378 using override system 110 makes system 100 more versatile (e.g., it can change modes to increase an amount of functions device 102 can perform).

CONCLUSION

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A system, comprising:
a control system that is configured to transmit control signals to a device to place the device in a first or second state, one of the first or second states being a master state and another one of the first or second states being a client state;
an initialization system that is configured to transmit a first signal to a first node of the control system that is used by the control system to produce a corresponding first one of the control signals to initialize the device;
a strapping system that is configured to transmit a second signal to a second node of the control system that is used by the control system to produce a corresponding second one of the control signals to place the device in the first state; and
an override system that is configured to transmit a third signal to a third node and a fourth signal to a fourth node of the control system, the third and fourth signals being used by the control system to produce a corresponding third one of the control signals to place the device in the second state.

2. The system of claim 1, wherein the second state comprises a temporary state.

3. The system of claim 1, wherein the first state is the master state and the second state is the client state.

4. The system of claim 1, wherein the first state is the client state and the second state is the master state.

5. The system of claim 1, wherein the control system comprises:
a first multiplexer that is configured to receive the third signal from the override system at its control terminal, which is the third node, and that receives at its input terminals, which are the second and fourth nodes, the second signal from the strapping system and the fourth signal from the override system;

a second multiplexer that is configured to receive the first signal from the initialization system at a control terminal, which is the first node, and that receives at its input terminals a HIGH signal and a signal from the first multiplexer; and an OR gate that is configured to receive a test mode signal and a signal from the second multiplexer and that outputs the control signals.

6. The system of claim 1, wherein the initialization system comprises:
a flip-flop that is configured to receive a power-up/reset signal and a clock signal, and that outputs the first signal to the control system; and
an OR gate that is configured to receive the first signal and a hardware signal, and that outputs a signal to the flop-flop.

7. The system of claim 1, wherein the strapping system comprises:
a resistive device; and
a storage device, wherein the storage device outputs the second signal.

8. The system of claim 1, wherein the override system comprises:
an exclusive OR gate that is configured to receive the control signal from the control system and a software CPU reset signal;
an AND gate that is configured to receive a signal from the exclusive OR gate and a write CPU reset signal; and
an OR gate that is configured to receive a signal from the AND gate and the fourth signal generated by a flop-flop, the flip-flop receives a signal from the OR gate, from a clock, and the hardware reset signal to generate the fourth signal.

9. The system of claim 1, wherein the device comprises a processor.

10. A system, comprising:
means for controlling a mode of a device, wherein the controlling means transmits control signals to the device;
means for initiating the device, wherein the initiating means transmits a first signal to a first node of the means for controlling, the first signal being used by the means for controlling to generate a corresponding first one of the control signals that is used to initiate the device;
means for strapping the device in a first mode, wherein the strapping device transmits a second signal to a second node of the means for controlling, the second signal being used by the means for controlling to generate a corresponding second one of the control signals that is used to place the device in the first mode; and
means for overriding the first mode and for placing the device in a second mode, wherein the overriding means transmits a third and fourth signal to third and fourth nodes, respectively, of the means for controlling, the third and fourth signals being used by the means for controlling to generate a corresponding third one of the control signals that is used to place the device in the second mode,
wherein one of the first or second modes is a master state and another one of the first or second modes is a client state.

11. The system of claim 10, wherein the second mode comprises a temporary state.

12. The system of claim 10, wherein the first mode is the master state and the second mode is the client state.

13. The system of claim 10, wherein the first mode is the client state and the second mode is the master state.

14. The system of claim 10, wherein the means for controlling comprises:
a first means for multiplexing that receives the third signal from the means for overriding at a control terminal, which is the third node, and that receives the second signal from the means for strapping and the fourth signal from the means for overriding, which comprises a software CPU reset signal, at input terminals, which are the second and fourth nodes;
a second means for multiplexing that receives the first signal from the means for initializing at a control terminal, which is the first node, and that receives input signals from the first means for multiplexing and a HIGH signal; and
an OR gate that receives a test mode signal and a signal from the second means for multiplexing and outputs the control signals.

15. The system of claim 10, wherein the means for initializing comprises:
a flip-flop that receives a power-up reset signal and a clock signal, and outputs the first signal to the means for controlling; and
an OR gate that receives the first signal and a hardware reset signal and outputs a signal to the flop-flop.

16. The system of claim 10, wherein the means for strapping comprises:
means for multiplexing that receives a strapping input signal from a resistive device and a signal from the means for overriding and that outputs a signal to the means for controlling.

17. The system of claim 10, wherein the means for overriding comprises:
an exclusive OR gate that receives the control signal from the means for controlling and a software CPU reset signal;
an AND gate that receives a signal from the exclusive OR gate and a write CPU reset signal; and
an OR gate that receives a signal from the ANT) gate and the fourth signal generated by a flop-flop, the flip-flop receives a signal from the OR gate, from a clock, and the hardware reset signal.

18. The system of claim 10, wherein the device comprises a processor.

19. A method, comprising:
controlling a mode of a device, wherein a control system transmits control signals to the device;
initiating the device, wherein an initialization system transmits a first signal to a first node of the control system, the first signal being used by the control system to generate a corresponding first one of the control signals that is used to initiate the device;
strapping the device in a first mode, wherein a strapping device transmits a second signal to a second node of the control system, the second signal being used by the control system to generate a corresponding second one of the control signals that is used to place the device in the first in mode; and,
overriding the first mode and for placing the device in a second mode, wherein an override system transmits a third and fourth signal to third and fourth nodes, respectively, of the control system, the third and fourth signals being used by the control system to generate a corresponding third one of the control signals that is used to place the device in the second mode,
wherein one of the first or second modes is a master state and another one of the first or second modes is a client state.

20. The method of claim 19, wherein the first state is the client state and the second state is the temporary master state.

21. The method of claim 19, wherein the device comprises a processor, wherein the processor is a client processor in the first state and a master processor in the second state.

22. The method of claim 21, wherein the second state is a temporary state.

* * * * *